US008145758B2

(12) United States Patent
Kajiya

(10) Patent No.: US 8,145,758 B2
(45) Date of Patent: Mar. 27, 2012

(54) CONCURRENT PROCESSING WITH UNTRUSTED BEINGS

(75) Inventor: James T. Kajiya, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 204 days.

(21) Appl. No.: 12/484,813

(22) Filed: Jun. 15, 2009

(65) Prior Publication Data

US 2010/0318655 A1   Dec. 16, 2010

(51) Int. Cl.
*G06F 15/173* (2006.01)
(52) U.S. Cl. ........ 709/225; 709/203; 709/229; 715/757; 717/129; 719/318
(58) Field of Classification Search .......... 709/203, 709/225, 229, 204; 715/757, 764; 717/129, 717/165; 719/318, 319
See application file for complete search history.

(56) References Cited

U.S. PATENT DOCUMENTS

| | | | |
|---|---|---|---|
| 5,519,862 A * | 5/1996 | Schaeffer et al. ............. 717/165 |
| 5,838,975 A * | 11/1998 | Abramson et al. ............ 717/129 |
| 6,335,765 B1 | 1/2002 | Daly et al. |
| 7,003,547 B1 * | 2/2006 | Hubbard ...................... 709/201 |
| 7,096,426 B1 | 8/2006 | Lin-Hendel |
| 7,325,014 B1 | 1/2008 | Kennedy |
| 2002/0169644 A1 * | 11/2002 | Greene ............................. 705/7 |
| 2005/0246726 A1 | 11/2005 | Labrou et al. |
| 2006/0004887 A1 | 1/2006 | Schenk |
| 2006/0212593 A1 | 9/2006 | Patrick et al. |
| 2009/0089364 A1 * | 4/2009 | Hamilton, II et al. ......... 709/203 |
| 2009/0106669 A1 * | 4/2009 | Winkler et al. ................ 715/757 |
| 2009/0235191 A1 * | 9/2009 | Garbow et al. ................ 715/764 |
| 2009/0282472 A1 * | 11/2009 | Hamilton et al. ................ 726/15 |

OTHER PUBLICATIONS

Alonso, et al., "Enterprise Application Integration (Middleware)", retrieved on Apr. 6, 2009 at <<http://www.iks.inf.ethz.ch/education/ws06/EAI/slides/Conclusions-2006.pdf>>, Computer Science Department, Swiss Federal Institute of Technology, pp. 2-49.
Kayal, "Introducing Enterprise Java Application Architecture and Design", retrieved on Apr. 6, 2009 at <<http://www.developer.com/java/other/print.php/10936_3808106_7>>, Mar. 3, 2009, 3 pages.
"MDD What's Next?", retrieved on Apr. 6, 2009 at <<http://www.ebpml.org/ebpml_radio.htm>>, 20 pages.
Meier, et al., "Chapter 10: Presentation Layer Guidelines", retrieved on Apr. 6, 2009 at <<http://apparchguide.codeplex.com/Wiki/View.aspx?title=Chapter%2010%20-%20Presentation%20Layer%20Guidelines&referringTitle=Home>>, Patterns & Practices: Application Architecture Guide 2.0 (The Book), 6 pages.
Noor, et al., "Optimising Distributed Object Technology for On-Demand Java Multimedia Database", retrieved on Apr. 6, 2009 at <<http://era.teipir.gr/era2/fullpap/B52.doc>>, Department of Computer Science, Faculty of Science and Technology, University Malaysia Terengganu, 10 pages.
Soares, et al., "An Architecture for Hypermedia Systems Using MHEG Standard Objects Interchange", retrieved on Apr. 6, 2009 at <<http://www-di.inf.puc-rio.br/~colcher/colcher_files/menu/pesquisa/pub_files/93_13_SOARES.pdf>>, 10 pages.

* cited by examiner

*Primary Examiner* — Ramy M Osman
(74) *Attorney, Agent, or Firm* — Lee & Hayes, PLLC

(57) ABSTRACT

This document describes tools for 1) structuring concurrent programming with untrusted beings; 2) creating multi-threaded programming in concurrent programming environments; and 3) creating a responsive feedback application model.

20 Claims, 4 Drawing Sheets

CONCURRENT PROCESSING WITH UNTRUSTED BEINGS

BACKGROUND

Concurrent systems have traditionally been difficult to program and use. For instance, parallel processes require concurrent program cooperation protocols to operate "perfectly". If a program in the concurrent system fails to perfectly execute a concurrent program cooperation protocol, a system failure will result. Thus concurrent programming systems are very brittle. This is especially problematic when executing untrusted third party programs which have not been carefully written and tested. Thus, a need exists for a safety mechanism to prevent system failures in concurrent programming environments.

Another problem is that concurrent programming is limited by traditional application programming models. Specifically, traditional application programming models like Graphics Device Interface (GDI+) have a presentation layer based on a fundamental and limiting assumption: namely, that there will only be one user, one keyboard, one mouse and one logical screen. Thus, these models can only run one program at a time. A need therefore exists for an application programming model that supports displays that multiple computers can share, multiple input devices, and environments with devices interacting with the system and then leaving the system without undue effort. Thus, a concurrent application programming model to write applications for a changing environment is needed.

Finally, concurrent programming models and non-concurrent programming models have failed to enable applications to be highly responsive to user input in tasks with high latency. Specifically, traditional models have used traditional controller structure application models. More specifically, traditional models use group models and controllers into one engine and a view engine into the User Interface (UI) engine. However, this separation limits the responsiveness of the application because there is no synchronization between what a user inputs and what feedback he/she receives. This is particularly a problem with relatively complex tasks that incur high latency. Thus, a need exists for a highly responsive application model which presents the user with responsive feedback from relatively high latency tasks.

SUMMARY

This document describes tools for 1) structuring concurrent programming with untrusted beings; 2) creating multi-threaded programming in concurrent programming environments; and 3) creating a responsive feedback application model.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

This document describes tools for 1) structuring concurrent programming with untrusted beings; 2) creating multi-threaded programming in concurrent programming environments; and 3) creating a responsive feedback application model. The described tools, therefore, provide a plurality of features that are useful in concurrent programming environments as well as in non-concurrent programming environments.

The discussion begins with a section entitled "structuring concurrent programming with untrusted beings," which describes one non-limiting environment that may implement the tools described herein. This section includes the following subsections: Illustrative Beings, Illustrative Worlds, Illustrative Creation Engine, Designing Applications for the Metaphysics and Orchestrating Media and the Presentation Layer. A second section, entitled "creating multi-threaded programming in concurrent programming environments", describes embodiments for creating multi-threaded programs in a concurrent programming environment as its name suggests. The discussion continues with third section entitled "creating a responsive feedback application model," which describes tools for creating a responsive feedback application model. The discussion concludes with a final section entitled "illustrative processes".

This brief introduction, including section titles and corresponding summaries, is provided for the reader's convenience and is not intended to limit the scope of the claims, nor the proceeding sections.

Structuring Concurrent Programming With Untrusted Beings

Figure 1:
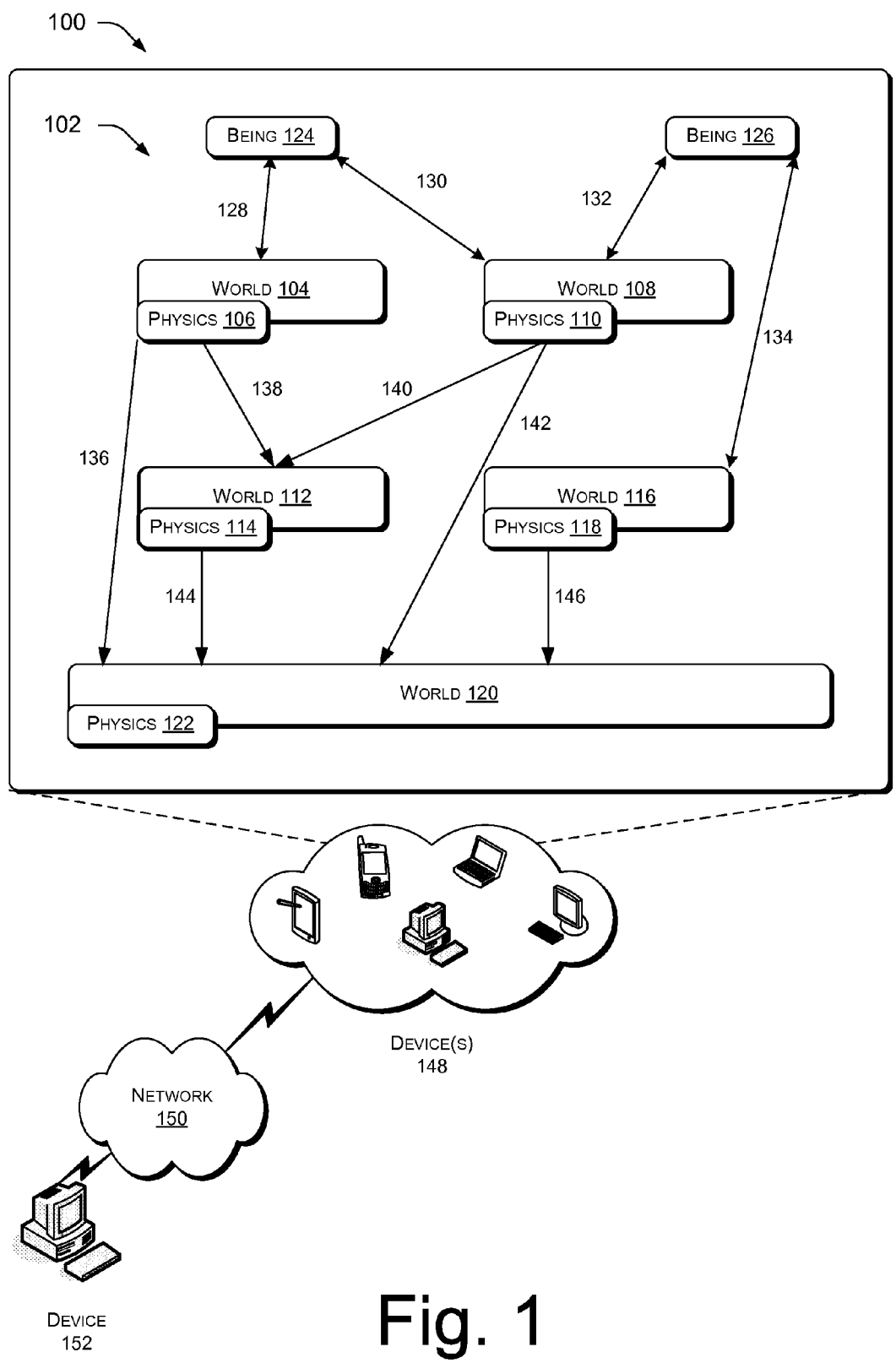
FIG. 1 depicts an illustrative architecture that includes a concurrent programming metaphysics comprised of worlds, beings and physics.

FIG. 1 depicts an illustrative architecture 100 that may employ the described tools. As illustrated, FIG. 1 includes a metaphysics 102 which is a programming model that serves to structure concurrent programs with untrusted beings.

The programming model of metaphysics 102 enables applications to function within a changing environment via an organization presentation model. In FIG. 1, the organization presentation model is organized around a series of fixed persistent worlds (worlds 104, 108, 112, 116 and 120) with which users, devices and applications may come into and out of the organization presentation model. In this embodiment, the worlds also have a physics associated to them (physics 106, 110, 114, 118 and 122 respectively).

Metaphysics is also comprised of beings 124 and 126. A collection of relatively independent beings may form an application. Each being may participate in one or more worlds. A world interacts with a being by permitting the being to manipulate some part of the world state. In FIG. 1 for instance, being 124 participates in worlds 104 and 108, while being 126 participates in world 108 and 116 via transactions 128, 130, 132 and 134 respectively. A being may come and go in the concurrent programming system and may enter or leave a relationship with any number of worlds. For instance, an application comprised of a group of applications may be introduced by a third party into the concurrent programming system. After the application completes the desired tasks by interactions with at least one world via transactions, the application may leave the concurrent programming system.

In one embodiment, a being does no sending or receiving of messages/events directly to or from other beings. In FIG. 1 for example, world 108 mediates interactions between beings 124 and 126. A being may be a sequential program in which a developer writes to design an application in the metaphysics 102. The developer accomplishes this by writing programs that act as beings to manipulate objects of some existing world or set of worlds. Thus, the developer does not create a distributed system so much as use an already existing distributed system by scripting an active being that interfaces with a number of worlds.

Worlds are also a component of metaphysics 102. A world may allow only a certain a set of object types to reside in the world. Additionally, the world may have a fixed set of rules which regulate the interactions between objects within the world and may also put additional constraints on the allowable manipulations of an object. Such rules which regulate activity within the world are characteristic features of the world.

Additionally, note that worlds (such as worlds 104, 108, 112, 116 and 120) may hold different and independent states and may provide an interaction mechanism by which interaction between beings is sorted into separate concerns. For example, in one embodiment, one world may concern itself solely with geometry while another world is concerned with photometry and yet another world is concerned with money. Additionally, in one embodiment, states within a world are never shared between beings directly. However, states, though unshared are not independent because the states are manipulated by interaction processes attached to each world, called the "physics" of a world. A world may comprise multiple computing devices, multiple displays, multiple objects and/or a combination of these entities.

In FIG. 1, a physics is attached to each world (e.g., physics 106, 110, 114, 118 and 122). The physics of a world comprise a fixed set of rules that enforce the rules within the world and that also serve to set other variables in response to the action of a being manipulating their connection variables (PVars). The physics of a world are also responsible for maintaining global invariants across the world. Thus, communication between one being to another being (with a world as an intermediary) may be viewed as the result of maintaining some constraint between the state variables at the connection variables of each being. In other words, the physics serves as a kind of data binding.

The data binding from the physics provides a significant generalization to data binding. For example, not only can two variables be constrained to equality, but far more subtle relations may be maintained between state variables.

For instance, in one embodiment, a being may want to manipulate the state of a world in a certain way that violates a rule of that world. The fixed set of rules in the world's physics will not allow that to occur. In contrast, physics may allow the manipulation of certain values which cause global changes to propagate through the state of a world. This occurs as the physics responds to the initial changes. In one embodiment, the way in which rules and responses are specified is via declarative specification of a constraint optimization problem which is solved by the physics.

In addition, a world may also include a telos. A telos is the mechanism by which changes in a given world may affect other worlds. In other words, a telos is a process that monitors (e.g., approves or denies) changes in a world and acts as a being in another world. This is particularly useful when monitoring an untrusted being that is attempting to make changes. An untrusted being, in one instance, is a third party program that a user may not trust. In many instances, a third party may not be written to work appropriately with a given environment or may even be maliciously written. This is especially problematic in concurrent program environments.

A telos of a world may be merged with the physics of that world. Thus, two different worlds may coordinate their actions via each of their teloses in another world.

For instance, in FIG. 1, being 124 participates with world 104 and 108 via transactions 128 and 130 respectively. Being 126 participates with world 108 and 116 via transactions 132 and 134 respectively. Interactions between being 124 and 126 are mediated directly via physics 110 (merged with a telos) since they both participate in world 108.

In addition, being 124 and being 126 may interact in more subtle ways. For instance, being 124 may make changes in world 104 which causes physics 106 to make changes in world 112 since physics 106 and 114 act as a teology for world 104 and 112. This may also restrict changes that being 126 may make in world 108 because physics 110 may be restricted on how it may manipulate its connection variables in world 112. Interaction may also be mediated more indirectly through the chains being 124→world 104→world 120 and being 126→world 108→world 120.

Application of metaphysics 102 to presentation layers may use a chain of interconnected worlds as in FIG. 1. Each of the worlds may treat some aspect of the overarching constraints between program state and sensory phenomena that the presentation layer is to maintain. For instance, close to the application, the state is relatively abstract and the world that the application may interact with may be merely a "software oscilloscope". In other words a world with probes into application state variables that are reflected further down the chain of worlds. Going further down the chain of worlds, the worlds become more and more concrete until the final links are worlds that may be almost purely sensory.

A presentation layer that uses the structure of metaphysics 102 solves many of the inherent problems of traditional presentation layers. First, traditional layers use data pipelines in which upstream data is processed into downstream data. This kind of data processing represents constraints which are all unidirectional with earlier data constraining the content of the late data. In contrast, metaphysics 102 has multi-directional constraints. This permits changes to propagate both up and down the world chain as well as across parallel world chains. Thus, metaphysics 102 permits easier interaction which in traditional pipeline schemes must be handled with special mechanisms outside the pipeline. In addition, multi-modal interactions (where different sensory modalities must be synchronized for output and interaction) are easier to program with multidirectional constraints.

Second, traditional pipeline layers are coarse. That is, processing each pipeline makes larger leaps in conceptual organization. This makes it very difficult to trace the effect of a change downstream and impossible to trace the effect of a change upstream. However, with application of metaphysics 102 to a presentation layer, transformations may be much finer. This permits a much closer correspondence of input to output, which makes declaring complex relationships easier to declare.

Third, traditional presentation layers fail to cleanly separate concerns. In other words, all aspects of the transformation are either mixed together in a single pipeline or are in complete separate subsystems such as an audio subsystem and graphics subsystem. Thus, an application must either consider all concerns simultaneously or force the application to manually synchronize different pipelines which makes the task intractable. However, with application of metaphysics 102 to a presentations layer, the concerns are separated into different worlds that are connected via structured relationships which may often be declaratively stated.

Finally, referring to FIG. 1, metaphysics 102 maybe contained in the memory in a single computing device or the in the memory of a plurality of computing devices 148 that are connected via a wire or wirelessly to a computer network. In other words, the different components of metaphysics 102 may reside on devices 148 or a single device. Typically, the representation of metaphysics 102 is contained within the memory of the computing device(s).

In addition, the devices 148 may also be in communication with another computing device 152 over a computer network 150 or devices 148 may be directly connected to device 152.

A computing device, meanwhile, may comprise any sort of device capable of executing computer-executable instructions on a processor. For instance, the device may comprise a personal computer, a laptop computer, a mobile phone, a set-top box, a game console, a personal digital assistant (PDA), a portable media player (PMP) (e.g., a portable video player (PVP) or a digital audio player (DAP)), and the like.

Illustrative Beings

In one embodiment, a being may be programmed imperatively, functionally, via production systems or using logic programming. The being may be able to issue queries into worlds, inject data into queries and accept data from those queries. The following embodiment uses C++ as the illustrative language binding, although other programming languages may also be used.

In this embodiment, beings find worlds in one of two ways. First, a being may find a world statistically in the source code via a uniform resource locator (URL), a globally unique identifier (GUID) or dragging and dropping an icon into the source such as:

```
Metaphysics::World w1;
Reason Metaphysics::World::find (
    &W1,
    "http://www.research.microsoft.com/PCvX/worldDirectory/ViaWorld");
Metaphysics::World w2;
Reason Metaphysics::World::find(&w2,GUID someRandomGuid); or
```

Second, a being may find a world dynamically by querying for a world. A chain of queries gains knowledge of the existence of worlds which stops at some static reference to a world obtained via the previous method. In this embodiment, dynamic attachment to a world is achieved via the following call:

```
        Reason Metaphysics::find(
            Metaphysics::world& world,
            "string",
            Metaphysics::world directoryworld) ;
```

Above, the function "Metaphysics::find" finds a world based on the string in some directoryWorld and returns a reference to it in its first argument.

The form of queries into a world varies with the kind of programming language used to implement a being. In one non-limiting embodiment, at the very minimum, several criteria should be satisfied by queries They should be able to block the being.

They should be able to succeed or fail.

They should be able to carry data from the being into the state of the world.

They should be able to carry data from the state of the world into the being.

They should be able to find state via search. The form of that search may be a simple associative lookup, or it may be more complex.

Although not necessary, it is very desirable for queries to be able to specify constraints on the states participating in the query.

In one embodiment, a programming language maybe used where a specific query mechanism is unnecessary. All that is required is that some variables be typed as participating in a given world by a distinguished set of data types. In these languages, the variables are manipulated by using the native mechanisms of the language. In addition, the variables automatically participate in queries.

Most of the wrappers (api calls) are involved in constructing a query rather than actually executing a query. For example, a call like GeometryFactory::createPolygon (pt1, . . . ,ptn) does not actually execute a transaction that creates the geometry, but simply appends a command to do so to the current transaction.

There are many calls that are involved in building a transaction, but only actually execute the transaction:

```
World::transactionClear( ); // clear the current transaction
Reason XWorld::comit( ); // actually execute the transaction and return
a Reason.
```

Where Reason is a data type that indicates either success or a reason for failure. In many instances, there is an automatic coercion from Reason to Bool for use in conditional statements or loops.

Illustrative Worlds

In one embodiment, every world is fully ontologically committed. In other words, all possible object and relation types in a world are fixed by the designer of the world. In this embodiment, beings may not create new types of objects nor may they make new types of relations. However, beings are free to instantiate as many objects and relations of a world's defined ontology as desired. Building things in a world is done via queries, but these may be wrapped in user friendly Class factories.

In one embodiment, media worlds can be created. One such example is a Geometry world. In this world, a developer constructs animated geometric objects. In this embodiment, an assumption is made that all the code is contained in the namespace GeometryWorld.

Geometry world may contain a first type of objects such as a basic geometric object. There may be two types of basic geometric object: 1) a location point and 2) a displacement vector. There also may be a closely related composite object called a frame. A location point is a position in the world, a displacement is a directed distance, and a frame is a reference system for measuring locations and displacements.

There are several properties that each object has in this embodiment. For example, displacements may be scaled by real numbers and can be added together. Locations may be subtracted to yield displacement vectors, however, locations themselves may not be added or scaled.

Thus, these objects are basic data types. Specifically, location and displacement, are data types that express the fundamental geometry of a fine space, in a mathematical structure known as a torsor. To do measurement of locations and displacements a reference frame is used as a kind of measuring stick. For a given reference frame f, the measurement process will yield an array of real numbers, which are the measurements of a location or displacement given the frame. The same location or displacement will typically yield a different array of numbers when measured with respect to a different frame f. A reference frame f is a composite object consisting of a location f.origin, the frame origin, along with n linearly independent displacements, one for each axis of the geometry space, f.axis(n). In some instances, there will be one, two or three axes, viz. n=0, or is in {0, 1} or {0, 1, 2}.

In one instance, there is one reference frame, a predefined constant for each geometry world, called the standard frame f0. A function is used to measure locations and displacements. That function extracts the components of a location or displacement. That is:

```
void Location::components(float (&result) [3], Frame const f = f0)
void Displacement::components [float (&result) [3], Frame const f = f0)
```

These functions fill an array of floats with a measurement of a location point or displacement vector with respect to the reference frame f, which defaults to f0, if the argument is omitted. For a displacement, those numbers represent the components as measured against the axes in the frame f. For a location p, the numbers represent the components of the vector p-f.origin.

Locations and vectors in the world can be specified by calling the next two functions:

```
Location const GeometryFactory::Location(
    float const (&components) [3] ,Frame const f=f0) ;
Displacement const GeometryFactory::Displacement(
    float const (&components) [3] ,Frame const f=f0) ;
```

The resulting location p or displacement v is the entity that if measured using the component functions with respect to the frame f, would yield the array of the first argument. If the second argument is omitted, then f defaults to the standard frame f0.

Operations that may be performed on locations are:
Location const Location::move (Displacement const v) const; a new location moved by a displacement vector v.
Location const Location::scale(Location const o, real const s) const; the location found by scaling its displacement from some origin o by a factor s.
Location const Location::spin(Location const o,Displacement const v) const; the location found by rotating this location about origin o and axis v/|v| by angle |v|.
Location const lirp(float const t, Location const p, Location const p'); the location on a line segment between p and p' given by the barycentric coordinate t. Defined by lirp(t, p', p)=p+t*(p'-p).

Frame const Frame::translate (Displacement const v) const; make a new frame by translating this frame's origin by v.
Frame const Frame::tilt (Float alpha,Float beta,Float gamma) const;
The frame derived from the frame above has an identical origin but oriented by tilting the axes determined by Euler angles alpha, beta and gamma. Where alpha is the angle between the original x axis and the line of nodes; beta is the angle between the original z axis and the new z axis; and gamma is the angle between the line of-nodes and the new x axis.

Displacement vectors may also have these overloaded operators with the following meanings:
  operator+ (Displacement+Displacement, Displacement+Location, Location+Displacement)
  operator- (Displacement-Displacement, Location-Displacement, Location-Location)
  operator* (Float*Displacement, Displacement*Float)
const dot (Displacement const, Displacement const); the scalar valued dot product of two displacement vectors.

In this embodiment, a second kind of object in GeometryWorld is a domain. A domain may be a unit interval [0,1] or abstract such as a differentiable manifold. Geometric objects in GeometryWorld may be represented as parametric functions. For example, domains may represent a spatial extend, temporal duration, or a parametric variation.

There may be three kinds of domains: spatial, temporal and parametric. Each domain may be either continuous or discrete. In this embodiment, a basic continuous domain is the unit interval [0,1] and basic discrete domains are the integer intervals [0 . . . n−1]. Basic domains may be created by this call:
Domain const GeometryFactory::createSpatialDomain(int const iRange)
Domain const GeometryFactory::createTemporalDomain (int const iRange)
Domain const GeometryFactory::createParametricDomain (int const iRange)
Where iRange is a non-negative integer. If the integer is 0 the resulting range is the unit interval [0,1]. Otherwise the integer specifies the size of the discrete interval [0 . . . iRange−1].

In addition, there are several operations that may be performed on domains.
Domain const cond(Domain const d1,Domain const d2,predicate p);
Domain const forkfirst(Domain const d1,Domain const d2);
Domain const Cartesian(Domain const d1,Domain const d2);
A third kind of object in GeometryWorld may be maps. Maps are functions between domains and either geometric objects or other domains. For example, in this embodiment:
  A curve is a map from the domain [0,1] to locations. A line segment is a linear such function.
  A polyline is a concatenation of several line segments. That is, it is the location-valued map defined on a domain formed by concatenating individual domains of its line segments.
  A cubic Bezier curve is defined by the classical deCasteljau algorithm which is just the composition of three of lirps of a base polyline.
  A pencil of lines is a function from a spatial domain to lines.
  A ruled surface is simply the lirp of two curves (given by location maps defined on a common spatial domain) along a second spatial domain.
  A Bezier surface is simply the triple lirp of three ruled surfaces given by four cubic Bezier curves.

Maps may be created via the call:
Map const~eometr~actor~::createMap(Domain,X, X (&function) (Domain))
where X may be a Domain, Location, Displacement, Frame, or Map.

An operation defined on maps with a common domain is used to construct new domains (this is important in doing topologically more complex structures than cubes).
Domain const pushout[Map map1, Map map2);//pushout maps must have identical domains.

Common objects in GeometryWorld maybe defined in terms of locations, domains, and maps. However, it is convenient to have helper procedures that create them directly so that one does not have to think in terms of primitives:
Map const createPolyLine(const (&Location)[ ],n,Domain)
Map const createBezierCurve(const (&Locaiton)[ ]$,Domain)
Map const createBezierSnrface(const (&Location)[ ] [ ], n, m, Domain)
Map const createTriangle(const (&Location)[3], Domain)
Map const createPolygon(const (&Location)[ ],n, Domain)

Other objects and operations may be used in GeometryWorld to set constraints and compute quantities based on geometries:
Derivatives (for curve tan, nor, binor; surface tangents, normal)
Index/winding number (for parallel filling ops)
Tensor, Exterior product
Compute Intersections, Tangents, Envelopes, Offsets
Constraints
  point: on point, line, surface, in subdomain (halfspace, discrete grid)
  line: contains point(s), tangent to surface,curve; normal to surface, curve;
  line: parallel to line; slope constrained to domain(halfspace, discrete directions)
  plane: tangent to surface, Frobenius distribution
  curve, surface
Solving for correspondence to yield Cech
  Intersection curve of two surfaces
  thicken to tubular neighborhood
  partition of unity on tube
  A parameterized set of location correspondences between two images: interpolate to some domain for morphing
Defining maps of ID domains for regular expressions
  Definition X(a,b)= . . . a . . . b . . .
  Define a* to be X=aX
  hold(a)=a a(l)*
  Button: B=mo?bold(bu? hit B:B):normal B
Turner's operations
  Parallel Fill
    split curve, homotopy between halves, render surface mod 2 . . .
      index computation mod 2, works for any closed curve, surface.

In addition to a GeometryWorld, other worlds may be created. One such world is RealizerWorld. A RealizerWorld may be responsible for realizing data into geometry. This may be the first half of the visualization step. The other half of the visualization step may be rendering geometry into images, which is handled by GeometryWorld and PhotoWorld. The first three objects may construct dataflow expressions:
RealizerFactor::create Vars
RealizerFactor::createOperators
RealizerFactor::createExpr In RealizerWorld, the teleology may call to export realized variables to lower worlds.

Another kind of world that may be created is a NewtonWorld, which creates Newtonian physics such as collisions, Bboxes and gravity.

Yet another kind of world that can be created is PhotoWorld which may be coupled to GeometryWorld via a telos. Geometric objects have various maps attached which are defined on the common domain with values in photometric parameters. These photometric parameters then go into shaders. Photometric parameters may be:
Normal maps
displacement maps
color maps
transparency maps
BRDF maps, BTDF maps
In addition, the different ways of specifying maps should be defined:
Pedin
Fourier
Texture synthesis
decals
environment maps, etc.

In addition, in PhotoWorld—cameras may take pictures of the geometry to make images. These images are maps from a spatial domain to color, transparency. These maps may also be used to texture objects.

Another example of a world is LayoutWorld. This world is where layout of 2½ dimensional areas is accomplished. In other words, beings in layout world are 2½ dimensional deformable shapes (viz., 2-dimensional areas which live on different layers).

LayoutWorld may consist of a canvas and grid upon which beings are arranged. A canvas is a portion of a two dimensional Euclidean space measured by a right handed Cartesian coordinate system. The canvas has attached to it two curves, a left and right border curve that delimits the possible area that forms the canvas. Canvases are horizontally convex regions of the plane that form the world. A region A, is horizontally convex if it contains all horizontal lines whose endpoints. The canvas may also have a grid which is a pair tables of specified x and y coordinates that partition the space into a set of cells. The first sequence of horizontal positions for the origin and corner of each cell, the second is a sequence of vertical positions that mark the origin and corner of cells.

In this non-limiting example, the grid is a two by two arrangement of cells given by (xi, yj) coordinates of origins and corners. The points on the canvas are elements of a weighted affine space.

LayoutWorld may also include beings which may be two dimensional shapes. Beings in the world may be horizontally convex in the plane and laid out on the grid in the world and their borders may adjust to other beings depending on the applicable physics. A region is an object with the following fields:
Basepoint—an (i,j) index into the grid sequences
Offset—an (x,y) offset of the basepoint from the cell origin.
Scale—an (xScale,yScale) pair that scales the size of the being (these scales may be negative)
Rotation—a real number indicating the amount of rotation
Layer—an integer rank for the visibility of the layout being
Left border curve—a curve or polygon specifying the left edge of the being
Right border curve—a curve or polygon specifying the right edge of the being As seen above, the basepoint, offset, scale and rotation fields specify the coordinate transformation from the local 2D coordinates of the being onto the canvas coordinates. The layer is an integer specifying the rank of the layer on which the being lives. Higher values indicate higher rank layers which take precedence for visibility. The left and right border curves determine the shape of the layout being.

Each real number parameter in the being may have an associated pair of compliance parameters. That is offset, scale, rotation, left border curve, and right border curves all have associated with them a setpoint value (the number at which the parameter would take if no forces were put upon it), and a stiffness or tension for each parameter. For example a left edge with a high tension indicates that the edge is "hard." Compliance parameters may also be subject to interval constraints beyond which a parameter may stray only with a large expenditure in energy. These compliance parameters can be absorbed into the very definition of the parameters by using weighted affine spaces.

LayoutWorld may also include a physics. In LayoutWorld, beings may be laid out by assigning them to cells and fixing the geometric transformation between the canvas coordinates and the local coordinates of the being. If all beings on all levels fit within their assigned cells, layout is trivial. For each level, the basepoint is positioned at the cell origin offset setpoint. Scale and rotation parameters are set to fill the cell depending on the compliance of the parameters. Beings on different levels usually do not interact even if they overlap. Beings residing on levels of higher rank may be composited over beings of lower rank.

Layout physics may take into account the natural set points and the stiffness of the scale, offset, and rotation parameters, so that an optimum configuration among the set of beings can be found to satisfy the non-overlap of all beings at each level. Additionally, depending on the tension of each edge, a being can deform. For instance, when a being with soft edge meets a being on the same level with a hard edge, the soft edge will deform to the shape of the hard edge. Two edges with equal tension will both deform.

The forces of interaction between layout beings is determined by a Hookean square law, and the physics seeks the minimum energy configuration. Layout is also affected by external forces. When a being is selected and dragged, it encounters an external-force that offsets it. Also, some layout physics may actually reassign beings to different cells, swapping them to leach lower energies LayoutWorld may also include a telos. The telos of a layout reports the minimum energy configuration of each being in the world. This data is used to lay out the internals of each being, and as information used in the image compositing world. For example, once a horizontally convex area is determined for a text area, the text can be set within the shape.

Beings can be created in LayoutWorld via a creation engine. As with most worlds in the metaphysics model, the creation engine is responsible for populating the world with beings. The Cartesian connection is responsible for synchronizing application data to layout parameters. These connections determine the geometry, the topology, and the style of items in a world. The geometry, specified by the set of compliance parameters, is determined by a set of analytic constraint equations between the application data and parameter values of specific beings. The grid proportions may be specified via a set of global constraints and optimization criteria. Which beings are created, the number of rows and columns in the grid, and how beings are assigned to the grid is given by a set of hypergraph rewrite rules. A hypergraph rewrite rule takes hypergraphs in the application domain(which may often be just a set of disconnected nodes), and rewrites them into another hypergraph that determines the topological information in layout world.

Transformations also play a role in LayoutWorld. Transformations can play a much more sophisticated role than just assigning application data to fixed object slots. Three non-limiting examples will illustrate this.

The first example is for connected diagrams. For network-style data (graphs, trees, hierarchical block diagrams, etc.) the hypergraph rewrite rules will perform layout in two phases (floorplanning and routing). The floorplanning phase assigns hyperedges of a hypergraph to cells in a grid designed as part of the transformation. This floorplanning can take into account the connectivity between hyperedges, routing congestion, clustering and other topological criteria to place beings in cells. The routing phase consists of drawing the connectivity between nodes. After floorplanning and routing is completed, the layout physics can then be applied to modify and move the beings to adjust the parameters for minimum energy.

The second example is for correlated semantic items. For example when text explains an illustration, it is desirable that the illustration be located near the explanatory text. There may be correlated sequences of illustrations along with captions. Each of these relationships represent implicit links with no visible manifestation other than proximity. Their realization is achieved through the identical floorplanning process just mentioned.

A third example concerns the aesthetic criteria involved in composition of pages. These criteria: balance, unity, clear paths for the eye to follow, color, etc. can usually never be completely reduced to algorithmic treatment. However, it may be crudely approximated by a combination of templating, analytic formulae, and human input. Using these combinations, the transformation process can approximate rules for visual design and composition.

Illustrative Creation Engine

The creation engine may be used for populating the world with beings. The engine has a pair of stacks: an expression stack that holds data, and a locals stack that holds frames. Each frame holds a list of arguments and local variables. As the engine executes it constructs a hypergraph in the hypergraph buffer obtained by composing the functions on the stack. The resulting hypergraph can then be stored in the world as Beings or Laws for the Physics Engine.

The following is a specification of an illustrative creation engine:

1. Push Data Types (Actually Push Constants: Functions of No Arguments to the Type).
   a. bool vX::Metaphysics::push(bool);
   b. int8 vX::Metaphysics::push(char);
   c. int16 vX::Metaphysics::push(short);
   d. int32 vX::Metaphysics::push(int);
   e. float32 vX::Metaphysics::push(float);
   f. float64 vX::Metaphysics::push(double);
   g. C++ fn/derivative vX::Metaphysics::push(void*( ), void( ));
   h. groups (sets) vX::Metaphysics::pushGroup(int);
   i. PVars: [( )→type] vX::Metaphysics::pushPVar(int);
2. Arithmetic Data Operations (These Compose with Items on the Stack and Leave the Composition on Tos)
   a. vX::Metaphysics::add( );
   b. vX::Metaphysics::sub( );
   c. vX::Metaphysics::mul( );
   d. vX::Metaphysics::div( );

3. Stack Operations (Manipulate the Stack Directly)
   a. Structural operations
      i. vX::Metaphysics::dup( );
      ii. vX::Metaphysics::swap( );
      iii. vX: Metaphysics::roll( );
      iv. vX::Metaphysics::rot(int);
   b. push quoted identityfunction vX::Metaphysics::I( );
   c. make a new locals stackframe' of she n vX::Metaphysics::mkFrame(int n),
   d. pop then top entries into the stackframevX::Metaphysics::sto(int n);
   e. push n entries from the stack frame starting at m vX::Metaphysics::rcl(int n,int m);
   f. pop the top of stack into local i on the stack frame vX::Metaphysics::pop(int i);
   g. push local i of the stack frame vX::Metapbysics::push (int i); . . .
   h. 'f—quote vX::Metaphysics::??
   i. compose vX::Metaphysics::compose( );
   j. push nth PVarvX::Metaphysics::pushPVar(int);
   k. pop to nth PVarvX::Metaphysics::popPVar(int n);
   l. push nth beingvX::Metaphysics::pushBeing(int n);
   m. pop to nth beingvX::Metaphysics::popBeing(int n);
   n. pop to constraint enginevX::Metaphysics::popLaw(int n);
4. Grouping Instancing
   a. h1 . . . hn assemble n→group—make a group from top n elements
   b. gp explode→h1 hn n—explode a group to n elements (n is on top)
   c. hej detach→( )—delete hej from group
   d. gp instance n→hej—create instance hej for group
   e. gp findAllInstances→inst1 . . . instn n
   f. gp splitOnPredicate pred→gp1 gp2
   g. gp" f→gp'—comprehension operations on groups
5. Constraints
   a. <,≦,=,!=,≧,>-I—Equality, inequality for setting up predicates This creation engine may be used in the following non-limiting example:

First, a Forth/postscript-like reverse Polish notation for the assembler syntax is used. (The assembler tokens are always delimited by spaces.) The variables are accessed by naming them, and appending a "!" to store to them. In this example, it is also assumed that we have defined points and displacements of geometry world in this example:

```
:: alpha ptl pt2 lirp $$ pt3 ||
alpha ptl *
1 alpha –
pt2 * + pt3!
;
```

The assembler then takes the first line to create a stack-frame with 3 args, no locals. After the semicolon we store the constructed function into the global variable lirp.

```
:: alpha ptl pt2 pt3 pt4 bezier → pt I alirp I
alpha I I lirp alirp!
ptl pt2 a lirp        -- pt12
pt2 pt3 alirp dup     -- pt12 pt23 pt23
pt3 pt4 alirp         -- ptl2 pt23 pt23 pt34
alirp                 -- pt12 p23 pt234
roll alirp            -- pt234 pt123
```

```
swap alirp            -- pt1234
pt!                   --store away in return value
;
```

This example uses lirp to compute a Cubic Bezier approximant via the celebrated.deCastlejeau.algorithm. The first line of the macro declares Bezier as a macro that has five inputs and one output, with a local variable call alirp. The second line defines the macro alirp to be lirp with the first argument fixed to be alpha. The rest of the macro is simply the deCastlejeau algorithm.

The curve can be used in several ways such as 1) A moving point along a spline curve: TVar p1 p2 p3 p4 bezier or 2) An interpolating curve: SVar p1 p2 p3 p4 bezier.

If a hypergraph is stored in a variable, then the variable is pushed and applied. Because constants are always functions of no arguments, applying such a function will evaluate to itself. Just like the value of 3 is 3, evaluating 3 ( ) goes to 3 ( ). Thus, for constants, push and push-apply are the same operation.

Creation engine may also create laws and beings. Expressions stored to beings or laws should be well-typed and closed. That is, these expressions should only have constants or PVars at their leaves and no identity functions. Attempting to store a function that is not well typed or closed will result in an exception.

Once the creation engine creates the worlds, an application can find the world via a set of apis:

```
Reason vX::Metaphysics::World::find(*Metaphysics::World,String);
Reason vX::Metaphysics::World::find(*Metaphysics::World,GUID);
Reason
vX::Metaphysics::World::find(*Metaphysics::World,String,
directoryWorld);
```

Designing Applications for The Metaphysics

In one embodiment, each interaction tier of the application interacts with its respective world in an identical way. As with most applications that have a presentation, there can be a dual development model. The first part of the model is design of the presentation. This involves choosing the objects in the presentation layer, their layout, and the static content of the presentation. This is can be done through a design tool, such as Visual Studio, Expressions, Director, etc. Alternately these may be defined from an XML file, such as XAML. In any case, the design tools all interpret inputs (whether mouse clicks or XML) and call factory methods provided by the presentation. In one embodiment, a Layerworld may be created. Layerworld may then create the relevant objects.

The design phase may focus not with creating a set of objects, but also in defining a set off relationships among the objects, as well as relationships between presentation layer objects and application objects. This may be done declaratively with a set of constraints. These constraints are expressed by a set of primitive relations combined with each other in a hypergraph structure.

The second part of the development model is to create the application. In previous development models, the application would not only be responsible for maintaining its own data structures, but also responsible for visualizing those data structures through the presentation layer. In previous direct mode systems, the application must do this via its data structures and calling draw routines at appropriate points. It must then execute this "animation loop" often enough to maintain a level of responsiveness to the user. Examples of this include GDI, DirectX, OpenGL, etc. In previous retained mode systems, the application must do this by explicitly maintaining a set of constraints between application data and the presentation model data. Thus, every time application is changed, edits must be made into the presentation layer objects to maintain a correspondence between the two data structures. Examples include visual basic, VRML, etc.

However, in one embodiment of the disclosed tools, the approach is different in that is does not require an application to execute an-animation loop, nor does it require that the application manually edit presentation objects to correspond to application data. The presentation objects are created at design time, as are constraints among them. Additionally, constraints are declared between presentation objects and application data at design time.

In C++, the application indicates which of its objects are subject to constraint by deriving from a particular base class template called Constrained. This base class ensures that the object is allocated in a port, an area of storage devoted to interaction with the presentation world. Depending on how the presentation is written, there may several ports.

Constrained objects may be referenced by variables of different storage classes. Some variables are mutable by the application, that is, they are non-constant variables. These can serve as input into the presentation layer. In one embodiment, they cannot serve as outputs from the presentation layer because it is not allowed to modify them. An object may be const volatile.

If it is const, the application may not modify the variable but is free to read it. Because it is volatile, the presentation may alter the data. Thus these variables serve as output from the presentation layer. Still other objects may be volatile and non-const. These variables may be modified by the application as well as by the presentation layer. They may serve as bidirectional interfaces. Time synchronization between the presentation layer and the application is performed via time stamps.

Control synchronization that coordinates between the presentation layer and the application is attained via a pair of transaction queues for each port. These queue pairs (QP) hold messages going in each direction that indicates that some change in the connection variables has occurred that should be examined for correctness, and if so, should be injected into the constraint network. Although the queues do not strictly always hold requests and acknowledgements, they can be named for convenience. Thus a queue pair QP=(RQ,AQ), a request queue and an acknowledge queue.

The RQ holds messages from the application to the presentation layer, and the AQ messages from the presentation layer to the application. One way of using QP is as follows:

1. Constrained application objects for a given port are freely modified during the execution of the application.

2. When a snapshot of the port is to be communicated with the presentation layer, an update request is enqueued in RQ for the port. The enqueue function returns a transaction identifier (TID).

3. After enqueuing the request, the application is free to continue execution. It may modify the connection variables further, or it may wait for an ack on the AQ for the port.

4. Upon receiving an ack for the TID, the application may determine whether the update succeeded or failed. If the update failed, a fail object embedded in the ack message gives a reason why the update failed. There may be many possible reasons for a failed update. The requested update may have requested an infeasible change that violates a global constraint for the presentation, the connection with the presentation layer may have been lost, there may be not enough memory to make a snapshot of the port, etc.

5. A port may be rolled back to the point when the transaction was issued. This is done via the Constrained base class: after enqueuing an update request, new writes to the object are redirected to a new copy of the connection variables. These maybe discarded or accepted when the transaction is rolled back or committed.

6. If a failed transaction is not rolled back, then all the ensuing modifications to constrained objects remain and a new update request may be issued.

7. If an update is acknowledged as a success, then const volatile variables are likely to be updated by the presentation layer. Also, the old copy of the port may be discarded by committing the transaction.

8. Acks may be received without any corresponding update requests. These are messages from the presentation layer to the application that signal some event. For example, a mouse click may be—such an event.

This coordination model is very flexible. The model works whether the application is single threaded or multi-threaded. If a single-threaded application chooses to always wait for an ack immediately after enqueuing an update, the model is tantamount to the windows message pump or animation loop. Multi-threaded applications can each have threads that monitor ack queues and perform the equivalent of callbacks to worker routines. Multiple ports may be updated sequentially or in parallel. This coordination model also works whether the presentation layer is local or remote. It accommodates a single application interacting with multiple instances of-presentation layers. It also accommodates multiple applications coordinating with a single presentation layer.

Orchestrating Media and the Presentation Layer

One application of metaphysics 102 is orchestrating media. Specifically, metaphysics 102 may be used to structure a compositional presentation layer by orchestrating domains Orchestration of the media is when the objects that comprise the media are aggregated, composed, processed and combined in the desired way via orchestration of the media domain. This results in the synchronization of media such as videos, text, pictures etc. One embodiment achieves the synchronization between domains without the use of tedious manual synchronizations which are difficult.

In a non-limiting example, synchronizing the functions of a video player is demonstrated. First the media is represented as a function with a specific domain and range. Second, the functions of the video player are composed together. Third, the functions are synced via a physics layer.

In this example, the video player comprises three objects 1) a slider being; 2) a video being; and 3) a time counter being. First, a domain for each being is created and the domains are each assigned a function. The various domains of the video player are then mapped to a single global space. Coincidence in the global space value indicates coincidence of points in the individual domains. Inversion may be used to invert a mapping function of local space to global space.

Then, a geometry world is created for the slider being, a counter world is counted for the counter being as well as a video world for the video being. These worlds are able to communicate to each other via a telos belonging to each world via the physics of each world. A fourth world-time world and an associated domain is created to synchronize the three other worlds. Time world also communicates to the other worlds via its physics and telos.

In this example, the physics inside of time world is instructed to synchronize the three functions inside the other worlds. Initially, a certain position in the video file is chosen to begin synchronization. This step picks the same point in the slider, video and counter functions via a function for each of these three domains which is created by time world. Then the functions from those domains can be added. When this addition is accomplished-the slider function, video function and counter function are synchronized. In one embodiment, Cech cohomology is used to orchestrate domains when maps are nonlinear.

Creating Multi-Threading Programs In Concurrent Programming Environments

Multi-threading programs in metaphysics 102 can be accomplished via a Cartesian connection model operating in retain mode. This connection model serves to make changes from an application state and reflect those changes in a world. In other words, this model is the mechanism by which applications modify parameter variables (PVars).

Specifically, this model uses connection variables to indicate which variables in an application are connected with specific variables in an API. These indications permit synchronization in a retain mode between a fixed world and unfixed beings. More specifically, this connection allows objects in a world but not in an application (for example an application graphics object) to be constantly synchronized like in a retain mode. In other words, objects are synchronized to an application state via data binding so an application can update its own variables while only building the objects once and changing state in retain mode.

Figure 2:
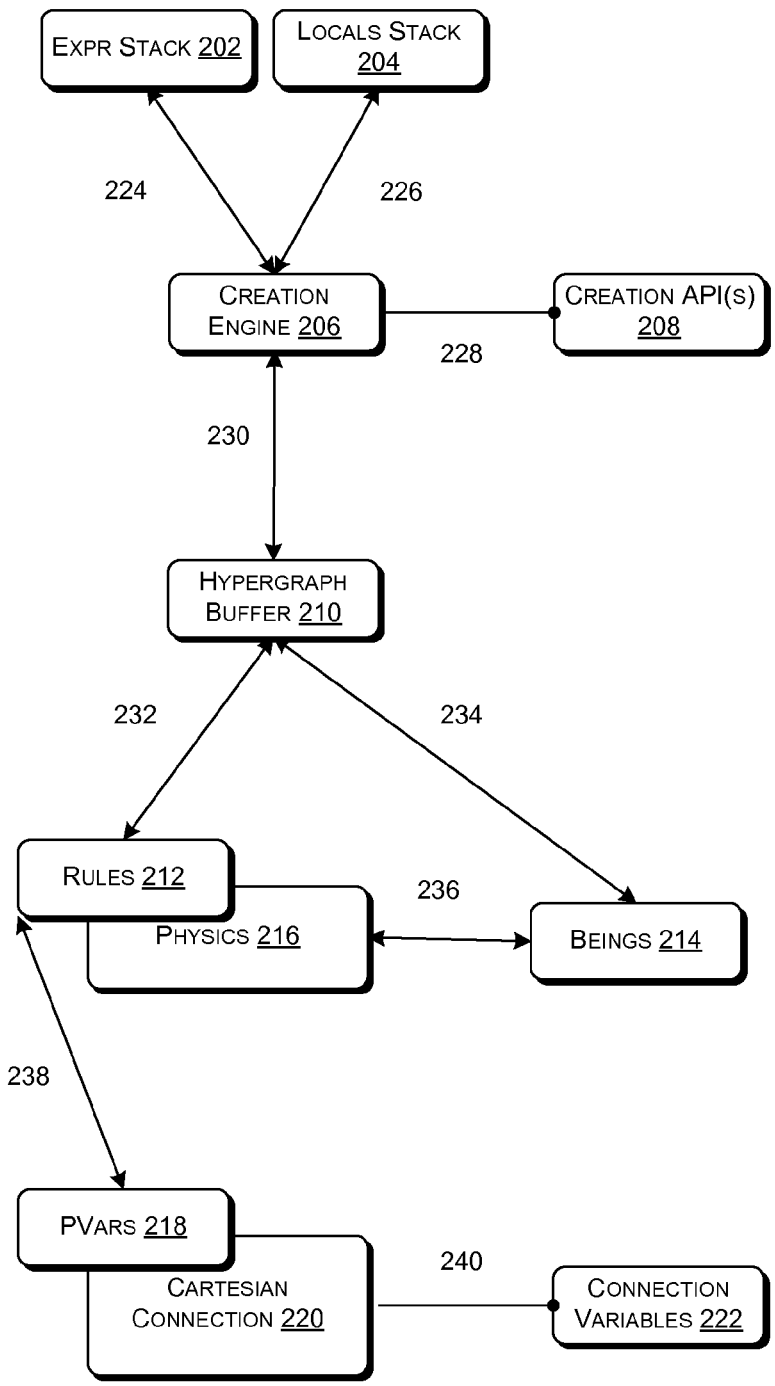
FIG. 2 depicts illustrative engines involved in synchronizing worlds with an application state.

Referring to FIG. 2, the creation Application Program Interface (API) 208 via communication 228 creates objects in the world as hypergraphs via creation engine 206 in a hypergraph buffer 210. (EXPR stack 202 and locals stack 204 act to hold temporaries for the construction of hypergraphs used in buffer 210.) In one instance, the objects may be beings and laws. After creating the beings and laws via the creation engine 206 and the creation API 208 (via communication link 228), an application then directs the behavior of its created beings by modifying the input PVars 218 defined for each being(s) 214 via communication 236, 238 and 240. In one embodiment, communications 224-240 are a flow of commands. The Cartesian connection 220 is the mechanism by which applications modify PVars. In other words the Cartesian connection synchronizes application variables and connection variables. The Cartesian connection may reside between the world and application. A Cartesian connection consists of several items:

- a set of connection variables declared in a C++ application as: CConn<type>var. A connection variable can be volatile or nonvolatile. Volatile variables are manipulated by the application and may well be manipulated by the physics engine as well. Nonvolatile variables should never be manipulated by the physics. Thus nonvolatile variables act as ordinary variables in a program save that they have an effect on beings and laws in the connected world.
- a queue pair, that is two queues, a request queue reqQ and an acknowledge queue ackQ which handles synchronization with the world.

A set of transaction operators: commit, cancel, rollback.

The way an application may interact with a world (after creation-time) is through a set of connection variables 222 via communication 240. These are like any other ordinary variables in the application in that they are freely accessible and modifiable at any time. However, when a queueCommit operation does three things:

- take a snapshot of the connection variables into a buffer;
- alert the world that a set of changes to PVars has occurred; or
- return a transaction ID (TID), to the application In response, the world will then attempt to make changes in the PVars 218 reflected in the hypergraph buffer 210 via communication 232 and 238. These changes may or may not violate the rules 212 of the physics 216. (Hypergraph buffer 210 may communicate with beings 214 via communication 234. Beings 214 may communicate with physics 216 via communication 236.) If the changes do not violate the physics 216, then the appropriate changes are made (including changes in the volatile variables). The PVar snapshot (which may be held in data structures inside of connection variables 222) is updated with any changes that the physics makes to volatile variables and a success acknowledge message is enqueued for the application. This ack message contains the updated buffer as well as the original TID of the request.

If the changes violate the physics' rules, a fail message is enqueued. The fail message contains the original snapshot buffer, the TID that caused the failure, and a reason code for the failure.

Note that an application that manipulates post-snapshot volatile variables runs the-risk that those changes may conflict with the changes made by the physics. If the original transaction is successful and the volatile variables are not conflicting, then the speculative changes to variables can be used for another transaction. If there is a failure, the application should roll back the variables to the transaction point and try other changes. If there is a conflict, only the application author is in a position to make an informed decision whether such conflicts require rollback or not.

Creating A Responsive Application Feedback Model

Metaphysics 102 can also incorporate a responsive application feedback model. In other embodiments, the responsive application feedback model does not require metaphysics 102. The responsive application feedback model focuses on structuring interactive programs to produce highly responsive user feedback regardless of the delay required to execute a particular task. This prevents the user from experiencing "freezing" of applications during tasks with high latency. Instead of "freezing", this model provides the user with feedback on the results of the task as they are completed.

The model categories tasks by latency. For instance, a computationally simple task (low latency tasks) would produce instantaneous feedback (<10 milliseconds). While, a computationally intense task (or tasks dealing with high latency devices like hard drives) which required a significant delay would produce feedback showing an update of the results of the task in real-time. This real-time response would vary according to the task.

For instance, a line justification calculation in a word processor is an example of a computationally intense task with high latency. Traditionally, there is a "freezing" when a user justifies text during the relative complex justification calculations. Under the responsive application feedback model, the user would be presented with the progress (updates) of the justification in real-time. In one instance, the user would see words and characters moving from one or more positions within the document as the justification calculation is done. Thus, what a user sees during the calculation may not be the end result, but the user will receive feedback that the calculation is being done via updates rather than simply being presented with the results after the calculation is done. This provides a responsive user experience.

Instead of the traditional simple model-view-controller design or UI/Engine architecture approach, the responsive application feedback model trifurcates interaction into three layers via task latency: 1) surface interaction (SI) which may be the top layer; 2) deep interaction (DI) which may be the middle layer; 3) external interaction (EI) which may be the bottom layer. SI produces nearly instantaneous feedback (e.g., <10 milliseconds), DI performs more complex calculations and may update SI state after initial feedback while EI performs very long latency operations and updates the DI state when interaction is done. In one embodiment, the feedback times from the various interaction layers may vary. For instance, the feedback may be instantaneous, nearly instantaneous or substantially instantaneous etc. In one non-limiting illustration, a range of substantially instantaneous feedback may be from 10 milliseconds to 1 second.

This trifurcation is done so any given interaction will not wait for an interaction below it. The user should receive complete or incomplete feedback (incomplete feedback output to the user would be determined by the application writer) via updates from deeper layers asynchronously.

Figure 3:
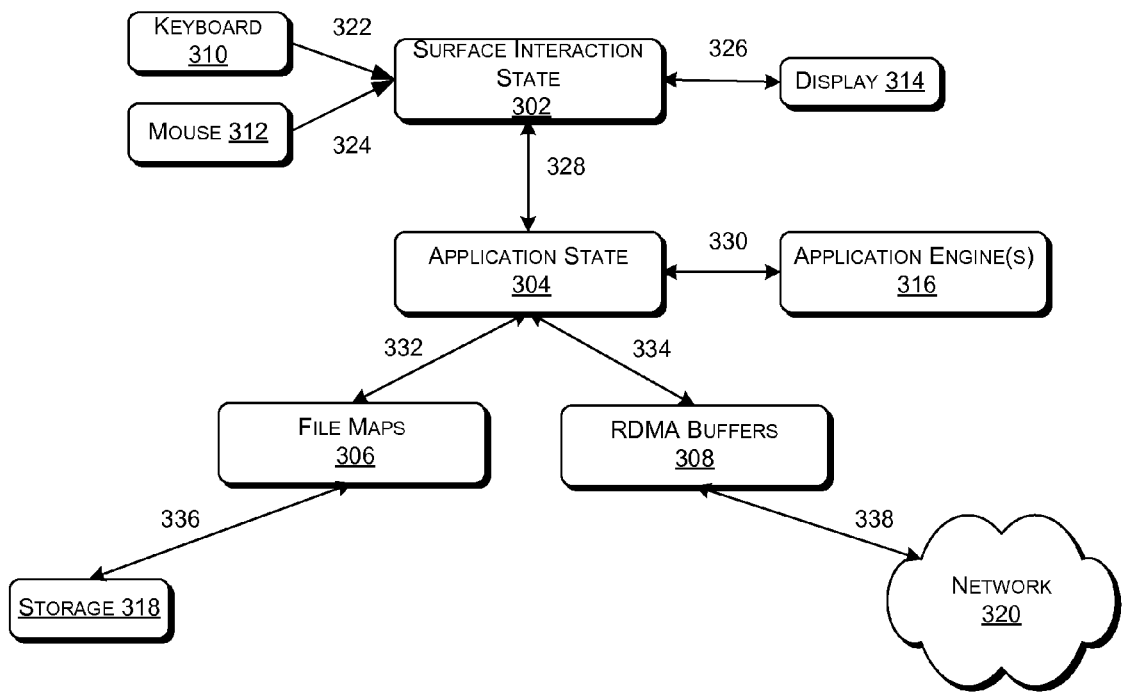
FIG. 3 depicts an illustrative process for a highly responsive application model.

Metaphysics 102 may incorporate the responsive application feedback model. In FIG. 3, several tiers SI, DI or EI are each given by a world and a set of beings that interact with each of those worlds. For instance, surface interaction state 302 would be associated with an SI tier, an SI world, SI associated beings and an SI telos. In a similar manner, application state 304 would be associated to a DI tier, worlds, beings and telos. Finally, file maps 306 and RDMA buffers would be associated with an EI tier with worlds, beings and a telos. In other embodiments, the number of tiers may vary according to the needs of the developer.

The definition of each tier and its contents are determined by 1) interaction latency requirements; 2) access latency to state; 3) complexity of transformation requirements. In one embodiment, each world has a telos that interacts with the interaction tier below or above it (via links 328, 332 and 334).

Referring to FIG. 3, surface interaction state 302 would be associated to a SI tier. This tier accepts keyboard 310 and mouse 312 input via communication links 322 and 324 as well as driving a display 314 via link 326 and may also have interaction with other devices. In one instance, this tier should never "block". Thus, its state is necessary to provide responsive interaction feedback to a user. It should have one or more processor cores servicing it to achieve an interaction latency of, for instance, less than 10 milliseconds.

Application state 304 would be associated to a DI tier. This tier would correspond to application engine 316 via link 330. The state of this tier may be contained in memory. The latency requirement of this tier is less stringent than the SI tier. The latency is determined by the complexity of transformation that the application engine 316 must perform on the application state. The engines such as application engine 316 that service this tier should only block for virtual memory page fetches. Thus, this tier is serviced by cooperatively scheduled cores that are dedicated to it.

File maps 306 and RDMA buffers 308 would be associated to an EI tier. This tier is responsible for persisting application state, communicating with networks 320 (via link 338) such as the Internet and other interactions with relatively long latencies. The state of the worlds in this tier is to serve as data buffers for data to be sent or received from slow interaction devices like storage device 318 via link 336. Latency generating devices should be decoupled into the SI, DI and EI tiers so that each can proceed interpedently of the tiers below it.

The design of a program using the responsive application feedback model would be determined by the design of the state in the worlds for each tier. In one embodiment, there should only be enough state in each world to provide for interaction in the tier associated to that world. Moreover, there should be no interaction looping though the tier below it.

Illustrative Processes

Figure 4:
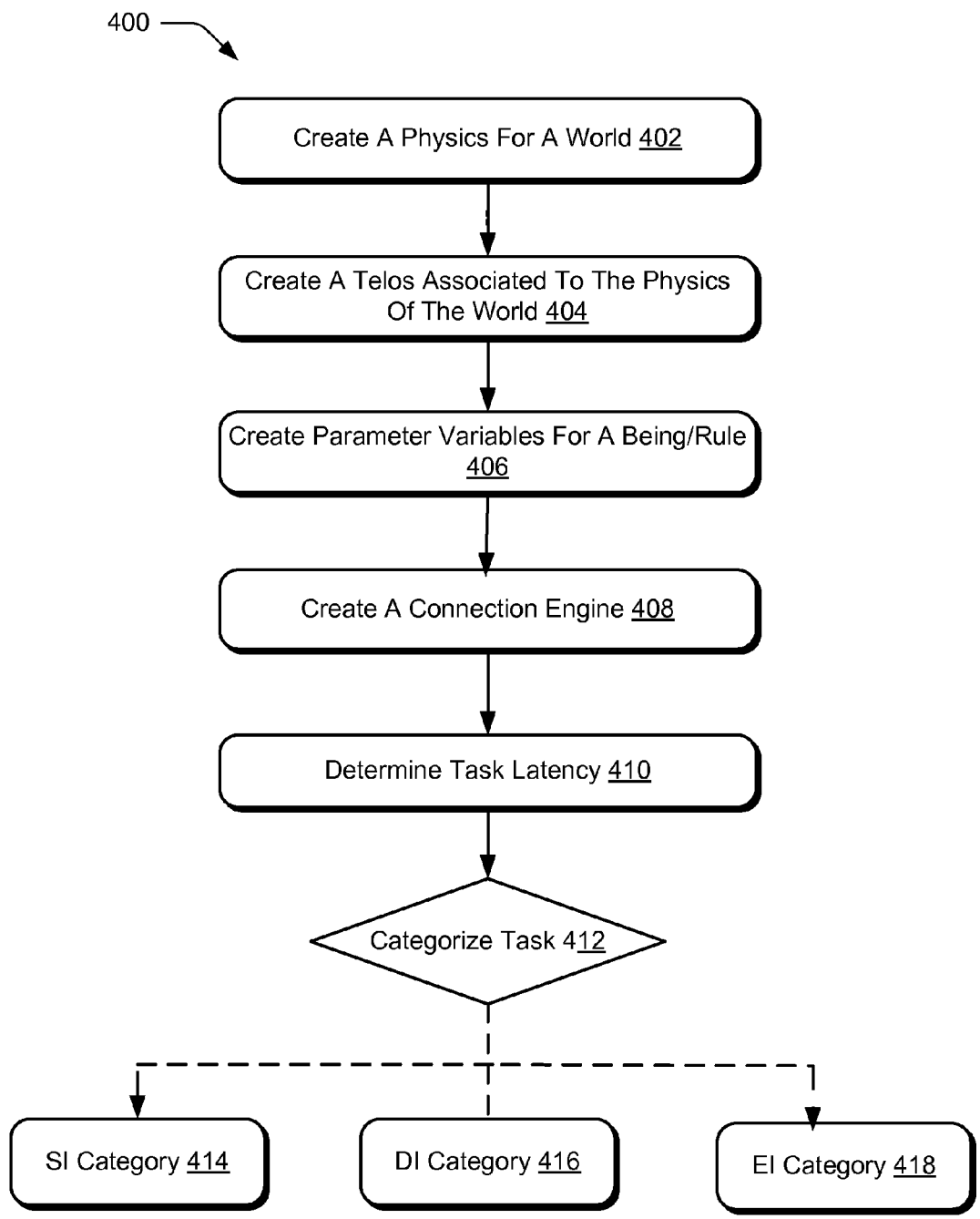
FIG. 4 depicts an illustrative process that that includes a concurrent programming metaphysics comprised of worlds, beings, physics as well as synchronization between a world and application.

FIG. 4 describes an example process 400 for employing the tools discussed above. This process is illustrated as a logical flow graph, which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

Process 400 includes an operation 402, which creates a physics for a world. The world may comprise multiple computing devices and multiple displays. The world may also comprise a computer network. The physics may comprise a fixed set of rules to apply to untrusted beings when the untrusted beings request to engage in a transaction with the world. Next, operation 404 creates a telos associated to the physics of the world. The telos may approve or decline transactions between the physics of one world and the physics of another world, as discussed above.

At operation 406, parameter variables are then created for a being or for a rule of the fixed set of rules of the physics of the world. At operation 408, a connection engine is created. This engine may be between the world and an application. The engine serves to synchronize parameter variables to application connection variables associated to the application.

Next at operation 410, in response to a user input, a latency for the task is determined. next, at operation 412, a world is created which categorizes tasks. Specifically, the world is configured to categorize tasks according to latency. In one instance, if the task requires less than 10 milliseconds response time-the task will be categorized in a surface interaction category. If the task requires interaction with an application engine performing a task on an application state (a higher latency task), then the task is categorized into a deep interaction category. Finally, at 412, if the task comprises communication with a network (highest relative latency task), then the task is categorized into an external interaction category. Typically, a deep-interaction task has a latency that is greater than a surface-interaction task, but less than an external-interaction task.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
under control of one or more processors configured with executable instructions:
creating a physics for a world comprising multiple computing devices and multiple displays, wherein the physics comprises a fixed set of rules to apply to untrusted beings when the untrusted beings request to engage in a transaction with the world;

creating a telos associated with the physics of the world, wherein the telos approves or declines transactions between the physics of the world and a physics of another world;

creating parameter variables for an untrusted being or for a rule of the fixed set of rules of the physics of the world; and creating a connection engine between the world and an application which synchronizes the parameter variables to application connection variables associated with the application in a retain mode system.

2. The method of claim 1, wherein the application comprises a first application and the untrusted being comprises a second application that is different from the first application.

3. The method of claim 2, wherein the world allows the first application and second application to run in parallel.

4. The method of claim 1, further comprising creating another world, wherein the world and the another world have different constraints on allowable manipulations on the multiple computing devices and multiple displays.

5. The method of claim 1, wherein the world is a first world and further comprising configuring another world to interact with the first world, the another world comprising a computer network.

6. The method of claim 1, wherein the fixed set of rules allows certain object types to reside in the world while disallowing certain other object types from residing in the world.

7. The method of claim 1, wherein the world also comprises a computer network that connects at least a portion of the multiple computing devices.

8. The method of claim 1, wherein at least one rule of the fixed set of rules is represented as a hypergraph.

9. The method of claim 1, wherein at least one parameter variable is volatile, wherein the physics is configured to manipulate the volatile variable.

10. The method of claim 1, wherein at least one parameter variable is nonvolatile, wherein the physics does not manipulate the nonvolatile variable.

11. The method of claim 1, wherein the physics and the telos of the words are configured to:
estimate a latency for a task;
based at least in part on the estimated latency, categorize the task into one of three categories:
a surface interaction category if the estimated latency is approximately less than ten milliseconds;
a deep interaction category if the estimated latency is a second latency which is greater than ten milliseconds; or
an external interaction category if the estimated latency greater than the second latency.

12. A computing device comprising:
a processor;
memory coupled to the processor; and
a physics module, stored in the memory and executable by the processor, to perform acts comprising:
creating a physics for a world comprising multiple computing devices and multiple displays, wherein the physics comprises a fixed set of rules to apply to untrusted beings when the untrusted beings request to engage in a transaction with the world;
creating a telos associated with the physics of the world, wherein the telos approves or declines transactions between the physics of the world and a physics of another world;
creating parameter variables for an untrusted being or for a rule of the fixed set of rules of the physics of the world; and
creating a connection engine between the world and an application which synchronizes the parameter variables to application connection variables associated with the application in a retain mode system.

13. The computing device of claim 12, wherein the application comprises a first application and the untrusted being comprises a second application that is different from the first application.

14. The computing device of claim 12, wherein the world allows the first application and second application to run in parallel.

15. The computing device of claim 12, further comprising creating another world, wherein the world and the another world have different constraints on allowable manipulations on the multiple computing devices and multiple displays.

16. The computing device of claim 12, wherein the world is a first world and further comprising configuring another world to interact with the first world, the another world comprising a computer network.

17. The computing device of claim 12, wherein the fixed set of rules allows certain object types to reside in the world while disallowing certain other object types from residing in the world.

18. The computing device of claim 12, wherein at least one rule of the fixed set of rules is represented as a hypergraph.

19. The computing device of claim 12, wherein at least one parameter variable is volatile, wherein the physics is configured to manipulate the volatile variable.

20. The computing device of claim 12, wherein at least one parameter variable is nonvolatile, wherein the physics does not manipulate the nonvolatile variable.

* * * * *